United States Patent

Poisner

[11] Patent Number: 5,890,012
[45] Date of Patent: Mar. 30, 1999

[54] SYSTEM FOR PROGRAMMING PERIPHERAL WITH ADDRESS AND DIRECTION INFORMATION AND SENDING THE INFORMATION THROUGH DATA BUS OR CONTROL LINE WHEN DMA CONTROLLER ASSERTS DATA KNOWLEDGE LINE

[75] Inventor: David I. Poisner, Folsom, Calif.

[73] Assignee: Intel Corporation, Santa Clara, Calif.

[21] Appl. No.: 428,572

[22] Filed: Apr. 25, 1995

[51] Int. Cl.[6] ............................. G06F 13/14; G06F 13/28; G06F 15/16

[52] U.S. Cl. ........................ 395/842; 395/824; 395/829; 395/851; 395/200.42

[58] Field of Search .............................. 395/200.16, 829, 395/851, 823, 842, 824, 200.42

[56] References Cited

U.S. PATENT DOCUMENTS

| | | |
|---|---|---|
| 4,467,411 | 8/1984 | Fry et al. ................................ 364/200 |
| 4,527,233 | 7/1985 | Ambrosius, III et al. .............. 364/200 |
| 4,987,529 | 1/1991 | Craft et al. ............................... 364/200 |
| 5,343,427 | 8/1994 | Teruyama ........................... 365/189.04 |
| 5,430,853 | 7/1995 | Arakawa ................................. 395/275 |
| 5,499,384 | 3/1996 | Lentz et al. ............................. 395/821 |
| 5,619,513 | 4/1997 | Shaffer et al. ......................... 371/25.1 |
| 5,685,012 | 11/1997 | Klein ....................................... 395/834 |

*Primary Examiner*—Thomas C. Lee
*Assistant Examiner*—Rehana Perveen
*Attorney, Agent, or Firm*—Blakely, Sokoloff, Taylor & Zafman LLP

[57] ABSTRACT

A slave DMA peripheral achieves the functionalities of a bus master without incurring the costs of additional address and control lines. Information regarding buffers to be accessed is loaded in the peripheral from the CPU. Actual buffer addresses, length values, and direction information are later programmed into the DMA controller by the peripheral. The present invention manages communication between the peripheral and main memory through the DMA controller. This allows the peripheral to access buffers in memory using a minimal number of lines.

18 Claims, 8 Drawing Sheets

SYSTEM FOR PROGRAMMING PERIPHERAL WITH ADDRESS AND DIRECTION INFORMATION AND SENDING THE INFORMATION THROUGH DATA BUS OR CONTROL LINE WHEN DMA CONTROLLER ASSERTS DATA KNOWLEDGE LINE

FIELD OF THE INVENTION

The present invention relates to the field of data transfer in a computer system. More specifically, the present invention relates to direct memory access (DMA) controllers that give bus master functionalities to peripheral devices.

BACKGROUND OF THE INVENTION

DMA is a method for direct communication between peripherals and memory. Direct communication is important in situations where data must be moved very rapidly between a peripheral and memory. Interrupt-initiated programmed processing of each data transfer would cost time and could possibly cause data to be lost. With DMA, no programming is involved in the actual transfer of data. Bytes are moved without program intervention between memory and peripheral via the bus.

A DMA controller is a specialized processor that transfers data between memory and peripheral while allowing the CPU to perform other tasks. Typically, the CPU first programs the registers associated with each channel of the DMA controller. The registers in the DMA controller are given a start address of a first buffer in memory where data can be read from or written to, the length of this buffer, and the direction of the data flow. A peripheral requesting a DMA transfer first signals the DMA controller via a DMA request line. The DMA controller, in turn, responds by returning a corresponding DMA acknowledge signal. The DMA controller then directs the transfers, asserting address and strobing lines, with the peripheral asserting or receiving data to or from memory. When the length field of the buffer in the DMA controller goes to zero and there is still data to be transferred, the DMA controller sends the peripheral a signal that the buffer in memory is full or empty, stopping the peripheral's activity. The DMA controller or peripheral also asserts a CPU interrupt signal. In response to the interrupt, the CPU reprograms the DMA controller, giving the DMA controller a start address of a subsequent buffer where data is to be read from or written to, the length of this buffer, and the direction of the data flow. After the DMA controller has been reprogrammed, data transfer resumes.

The DMA controller must interrupt the CPU whenever the length field of the buffer in the DMA controller goes to zero and there is still data to be transferred. This is undesirable for several reasons. CPU intervention during a DMA data transfer requires that the CPU be interrupted from performing other tasks. For example, when the main memory is used to do block transfers, several buffer addresses might be needed. This causes the CPU to be interrupted several times. Also, in situations where there is a very fast DMA, the CPU may not be able to respond to the interrupt within the defined amount of time, causing data to be lost.

An alternative method for DMA is using a peripheral which is a bus master. The bus master peripheral has several address and control lines which connect the peripheral to the memory. The address and control lines allow the bus master to access information regarding the location of buffers which need to be read or written to without interrupting the CPU. In order to support the address and control lines, a peripheral would typically require additional component packaging, additional pins, and additional pin holes on the system circuit board. This translates to an additional cost to the system and the elimination of valuable space on the system circuit board.

Another approach for DMA without requiring CPU intervention is the use of intelligent DMA controllers. Intelligent DMA controllers offer the additional functionality of being able to handle multiple buffers themselves. Different DMA controllers, however, offer varying degrees of flexibility. For example, some specialized DMA controllers have the ability to halt at a particular buffer or location in a buffer in memory and signal an error. Other specialized DMA controllers have the ability to put status information in separate data structures or the ability to return to the beginning or a mid-point in the buffer. Often, one is unaware of the types of peripherals that will be implemented on a system when a DMA controller is selected. Thus, the DMA controller may offer data transfer capability beyond system requirements or it may offer insufficient data transfer capability.

Thus, a DMA controller which is capable of performing a variety of data transfers without interrupting the processor is desired. The present invention overcomes the drawbacks of the prior art by providing an apparatus and method for permitting a peripheral device to achieve the functional benefits of a bus master without requiring the address and control lines required for a bus master.

SUMMARY

The present invention relates to a method and apparatus for DMA data transfer. This method of DMA data transfer includes transferring addresses of buffers accessed in memory, the lengths of these buffers, and transfer directions from the CPU to the peripheral performing the accessing. After this information is transferred to the peripheral, the peripheral programs the DMA controller with the address, length value, and direction information of a buffer which is to be read from or written to. This information is then used by the DMA controller to coordinate DMA. After data transfer between the peripheral and the buffer in memory has been completed, the peripheral programs the DMA controller with the address, length value, and directional information of a next buffer to be read from or written to if additional data transfer is required. This cycle continues until data transfer is completed.

In one embodiment, the apparatus of the present invention includes logic for managing a DMA controller and logic for managing DMA in a peripheral. The logic for managing the DMA controller prompts the DMA controller to perform I/O reads for loading the address counter, length, and direction fields of the DMA controller with address, length, and direction information in the peripheral. The logic for managing DMA in the peripheral prompts the peripheral to respond to I/O reads from the DMA controller by sending address, length, and direction information to the DMA controller.

BRIEF DESCRIPTION OF THE DRAWINGS

The present invention will be understood more fully from the detailed description given below and the accompanied drawings of various features and elements embodied in the invention. The description and drawings are not meant to limit the invention to the specific embodiment. They are provided for explanation and understanding.

DETAILED DESCRIPTION

A method and apparatus for providing the functionalities of a bus master to a peripheral device is disclosed. In the following description, numerous specific details are set forth to provide a thorough understanding of the present invention. However, it will be understood by those skilled in the art that the present invention may be practiced without these specific details. In other instances, well-known methods, procedures, components, and circuits have not been described in detail so as not to obscure the present invention.

Figure 1:
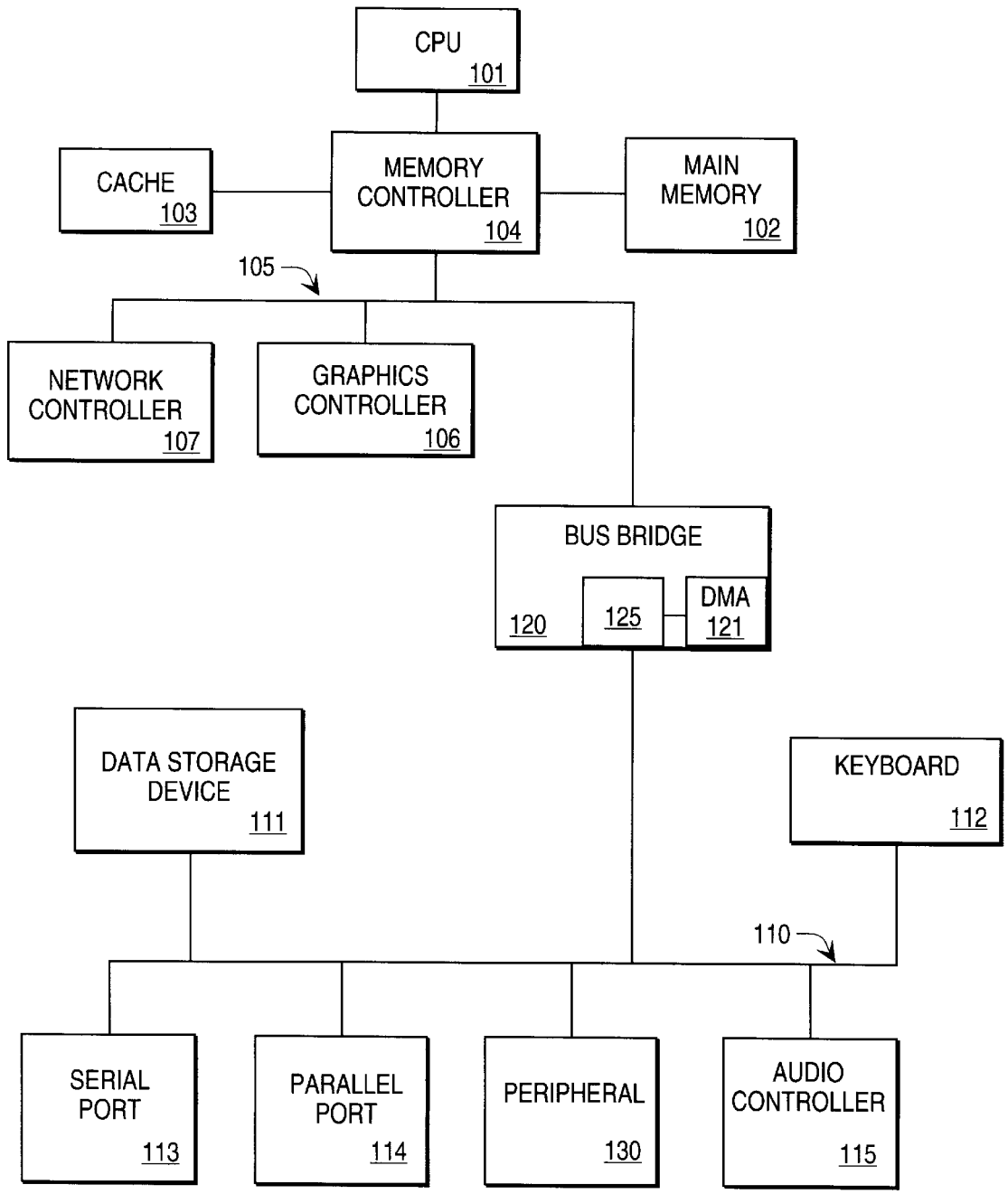
FIG. 1 illustrates a computer system configured with one embodiment of the present invention.

FIG. 1 illustrates a computer system configured in accordance with the present invention. The computer system comprises a CPU 101 for processing digital data. Main memory 102 is comprised of random access memory (RAM) or some other dynamic storage device which is used to store temporary variables or other intermediate information during execution of instructions by CPU 101. Cache memory 103 is comprised of storage space for holding frequently accessed instructions and data obtained from main memory 102 by the CPU 101. Cache memory 103 is used for reducing access time. CPU 101, main memory 102, and cache memory 103 are coupled to memory controller 104. Memory controller 104 directs data traffic between the CPU 101, main memory 102, and cache memory 103, and bridges signals from these components to high speed I/O bus 105.

High speed I/O bus 105 supports peripherals operating at high data throughput rates. High speed I/O bus 105 may utilize one of several bus standards such as PCI or VL for example. Graphics controller 106 and network controller 107 are coupled to high speed I/O bus 105. Graphics controller 106 coordinates and controls the graphical output to a display terminal. Network controller 107 links a network of computers together and provides communication among the machines. Both the graphics controller 106 and network controller 107 have high data transfer requirements.

I/O bus 110 is used for communicating information between peripheral devices which operate at lower throughput rates. I/O bus 110 may utilize one of several bus standards such as ISA for example. A data storage device 111 such as a hard, floppy, or optical disk drive is coupled to bus 110 for storing information and instruction. An alphanumeric input device 112, including alphanumeric and other keys, is coupled to bus 110 for communicating information to the CPU 101. Audio controller 115 for coordinating the recording and playing of sounds is also coupled to I/O bus 110 as are serial port 113 and parallel port 114 for attaching future peripherals.

Bus bridge 120 has a translator which allows it to bridge signals between I/O bus 110 and high speed I/O bus 105. In one embodiment of the present invention, DMA controller 121 is inside bus bridge 120. DMA controller 121 is a specialized processor that coordinates data transfer between main memory 102 and peripheral devices, while the CPU 101 performs other tasks. DMA pseudo bus master (PBM) logic 125 is coupled to DMA controller 121. DMA PBM logic 125 manages DMA controller 121 so that certain peripherals on the I/O bus 110 are allowed to achieve bus master functionalities without incurring the costs of having additional address lines.

In one embodiment of the present invention, peripheral 130 on I/O bus 110 is an I/O device utilizing the present invention. Peripheral 130 may be any one of several types of I/O devices which utilizes DMA. Peripheral 130 may be, for example, a storage device or an audio controller.

Figure 2:
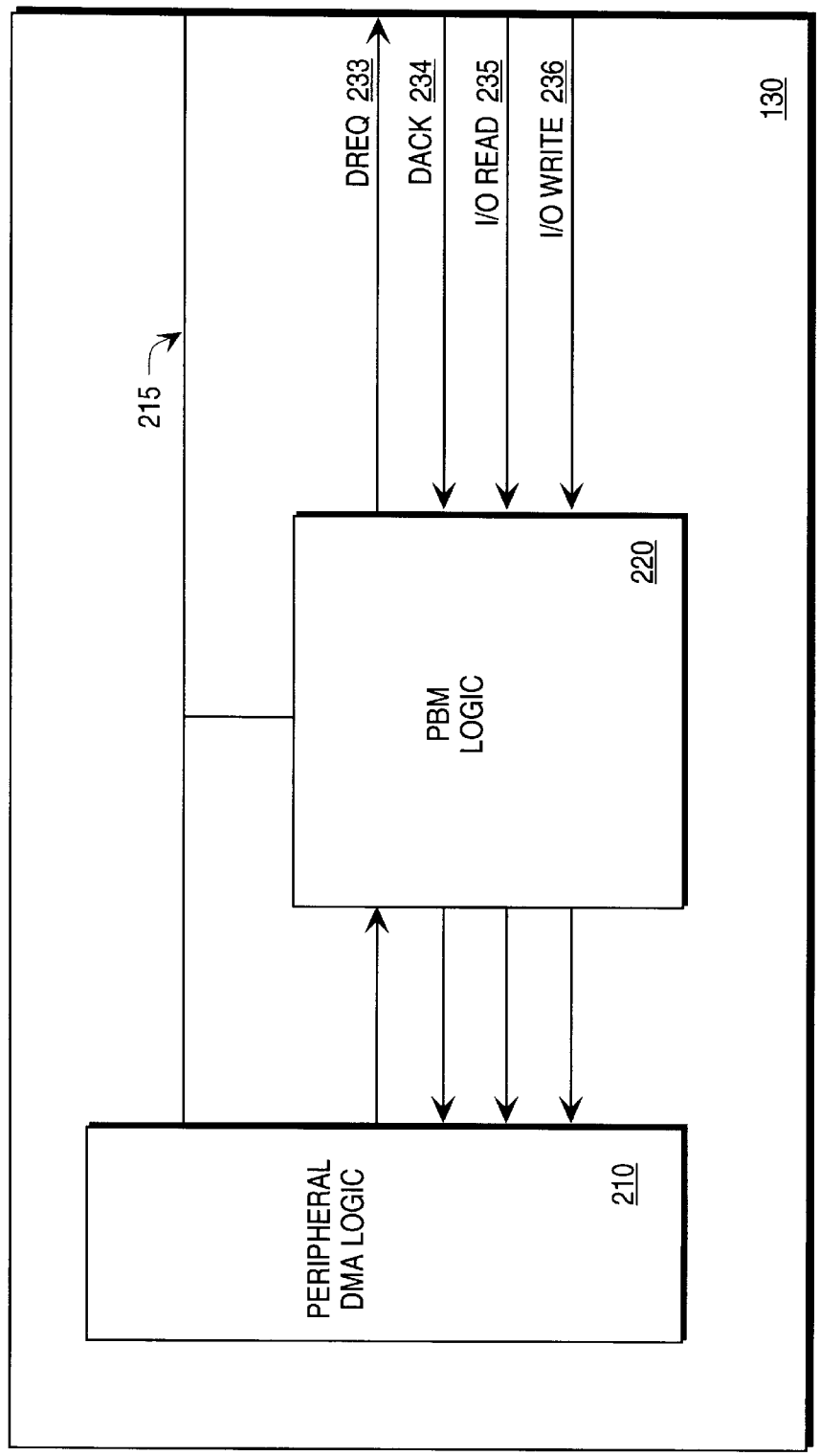
FIG. 2 illustrates a block diagram of a peripheral configured with one embodiment of the present invention.

FIG. 2 illustrates one embodiment of peripheral 130. Peripheral 130 comprises peripheral DMA logic 210 and peripheral PBM logic 220. Peripheral DMA logic 210 coordinates the data transfer in peripheral 130 as would DMA logic in a standard DMA slave peripheral. Peripheral DMA logic 210 is coupled to I/O bus connection 215 which is connected to I/O bus 110. CPU 101 uses I/O bus 110 to transfer control information to peripheral DMA logic 210. I/O bus 110 is also used for transferring data between peripheral DMA logic 210 and bus bridge 120. Control lines 233, 234, 235, and 236 are used to send control signals between peripheral DMA logic 210 and DMA controller 121. These signals include DMA request, DMA acknowledge, I/O read, and I/O write signal. In one embodiment of the present invention, peripheral PBM logic 220 comprises an address counter, a length register, and a direction register. Peripheral PBM logic 220 manages peripheral DMA logic 210 so that peripheral 130 achieves several bus master functionalities. Control lines 233, 234, 235, and 236 run through peripheral PBM logic 220 and allow it to intercept the control signals transferred on it. Peripheral PBM logic 220 is also coupled to I/O bus connection 215. CPU 101 uses I/O bus 110 and I/O bus connection 215 to transfer control information and memory addresses to registers in PBM logic 220.

When data needs to be read from or written to main memory 102, information regarding the location of the data buffers where the data is to be read from or written to is made available to the peripheral 130 by the CPU 101. Information regarding the length of each of the buffers and the direction of the data transfer are also made available to peripheral device 130. This information is later programmed by the peripheral 130 into the DMA controller 121 so the DMA controller 121 can direct the movement of data between the peripheral 130 and main memory 102. After the peripheral 130 is completely finished accessing one buffer in main memory 102, the peripheral 130 programs the DMA controller 121 with the address and length value of a next buffer if additional data needs to be transferred. This cycle continues until the data transfer between the two is completed.

The present invention provides the peripheral 130 with the locations of buffers in memory, the lengths of the buffers, and the direction of the data transfer. This allows the peripheral 130 to program the DMA controller 121 with buffer information and allows the peripheral to achieve several key functionalities of a bus master. One key functionality of a bus master is its ability to directly access information regarding the locations in memory where it is to read from or write to without interrupting the CPU. By having a device driver run by the CPU 101 pass information to the peripheral 130 regarding appropriate addresses, lengths, and direction of data transfer before the data transfer, neither the peripheral 130 nor the DMA controller 120 needs to interrupt the CPU 101 for buffer information during the data transfers. This allows the CPU to concentrate on other tasks. In situations where there is a very fast DMA, the present invention eliminates the risk of losing data since the CPU 101 is not available in time to respond.

Another functionality of a bus master is its ability to choose a location in memory where it wishes to read or write. This allows it to read or write the status of data in a buffer at the header of each buffer. Since the peripheral 130 of the present invention knows the location of memory buffers, it can elect to read or write status information for data in the beginning of each buffer. The peripheral can allocate which location it wishes to read or write data and later return to the front of the buffer and read or write in the status of the data. Error check bytes are normally at the end of a data transfer so typical slave DMA controllers cannot write the status of the data until all the data has been written. Typical slave DMA controllers lack the capability of backing up and writing the status information of the data at the head of the buffer and must write it at the end. This becomes a problem when the status information of a block of data is needed. A computer system utilizing a slave DMA controller would be required to hunt through the data for the status. The peripheral of the present invention, however, can set a pointer to the head of the buffer. After receiving the status of the data at the end of transmission, it can return to the head of the buffer to write the status at the location of the pointer.

Another functionality of a bus master is its ability to intermix DMA channels. DMA controllers required different DMA channels for reading and writing when a peripheral cannot initiate a read and write change. The present invention allows a DMA channel to perform both reading and writing by allowing the peripheral to initiate a read and write change. The present invention gives the peripheral the bus master functionality of accessing memory at any location it chooses.

CPU 101 can provide the start address, length field, and transfer direction to peripheral 130 in one of several ways. For example, in one embodiment of the present invention, CPU 101 could transmit a list of actual start addresses, length field values, and transfer directions into memory registers in the peripheral. In this embodiment of the present invention, peripheral PBM logic 220 would include a plurality of memory registers to store a plurality of start addresses, length values, and direction fields. When the peripheral 130 is finished reading from or writing to a first buffer in main memory 102, peripheral PBM logic 220 would program the address, length field, and transfer direction of the next buffer into DMA controller 121. In a preferred embodiment of the present invention, CPU transmits only a memory address to peripheral 130. The memory address has a list of pointers to buffers, their lengths, and their transfer directions. The peripheral 130 would be able to access this list and forward specific buffer addresses, length values, and direction information to DMA controller 121 when required. In this embodiment of the present invention, peripheral PBM logic 220 would include a register for storing the memory address of the list and a memory component for recording the last accessed address.

Figure 3:
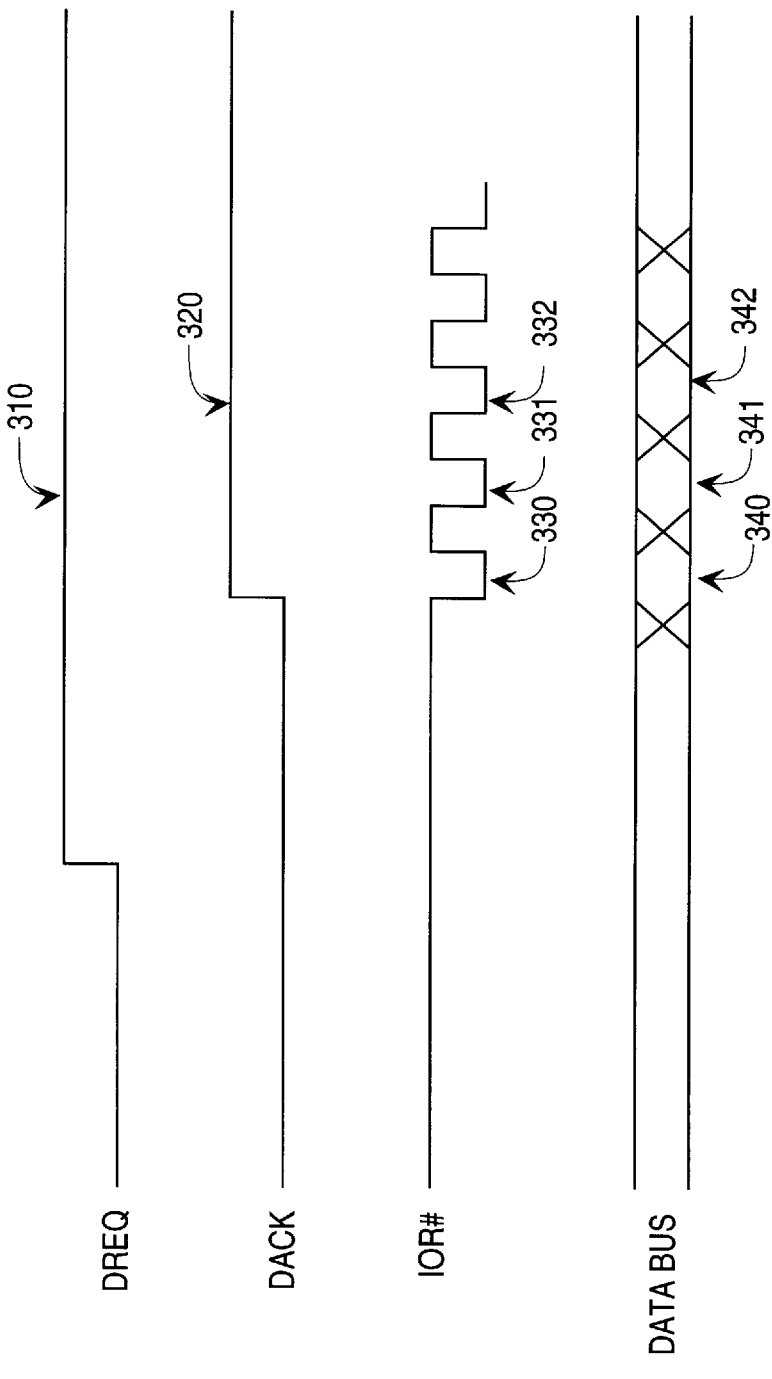
FIG. 3 illustrates the activities on the signal lines and data bus in one embodiment of the present invention.

The peripheral 130 can program the DMA controller 121 with relevant addresses, length values, and transfer directions in any number of ways. For example, the peripheral could transmit the information over the data bus during a read cycle. The peripheral could also transmit this information through the DMA channel on an encoded request signal over a DMA request line. FIG. 3 illustrates the activity on the signal lines and data bus in one embodiment of the present invention. Specifically, FIG. 3 illustrates the activity on the DMA request line (DREQ), DMA acknowledge line (DACK), I/O read line (IOR#), and the data bus. Typically, the CPU programs a peripheral of the present invention with start address, length filed, and transfer direction. Afterwards, the CPU asserts a start command to the peripheral. After receiving the start command, the peripheral requests access to the bus by signaling the DMA controller via a DMA request line as shown with high signal 310. When the bus is available, the DMA controller responds by returning a DMA acknowledge as shown with high signal 320. At this point, the DMA controller asserts several read cycles during which the peripheral provides the relevant start address, length value, and transfer direction of the first buffer that is involved in the current data transfer through the data bus. The read cycles are shown as low signals 330, 331, and 332 on IOR# line. As the read cycles are asserted, the peripheral sends data 340, 341, and 342 to the DMA controller through the data bus. If the transfer involves moving data from the peripheral to main memory, the DMA controller would continue to assert read cycles and proceed reading data from the peripheral into the first buffer of main memory at the fourth read cycle. If the data transfer involves moving data from main memory to the peripheral, the DMA controller would assert write cycles and move data from main memory to the peripheral on the data bus.

Figure 4:
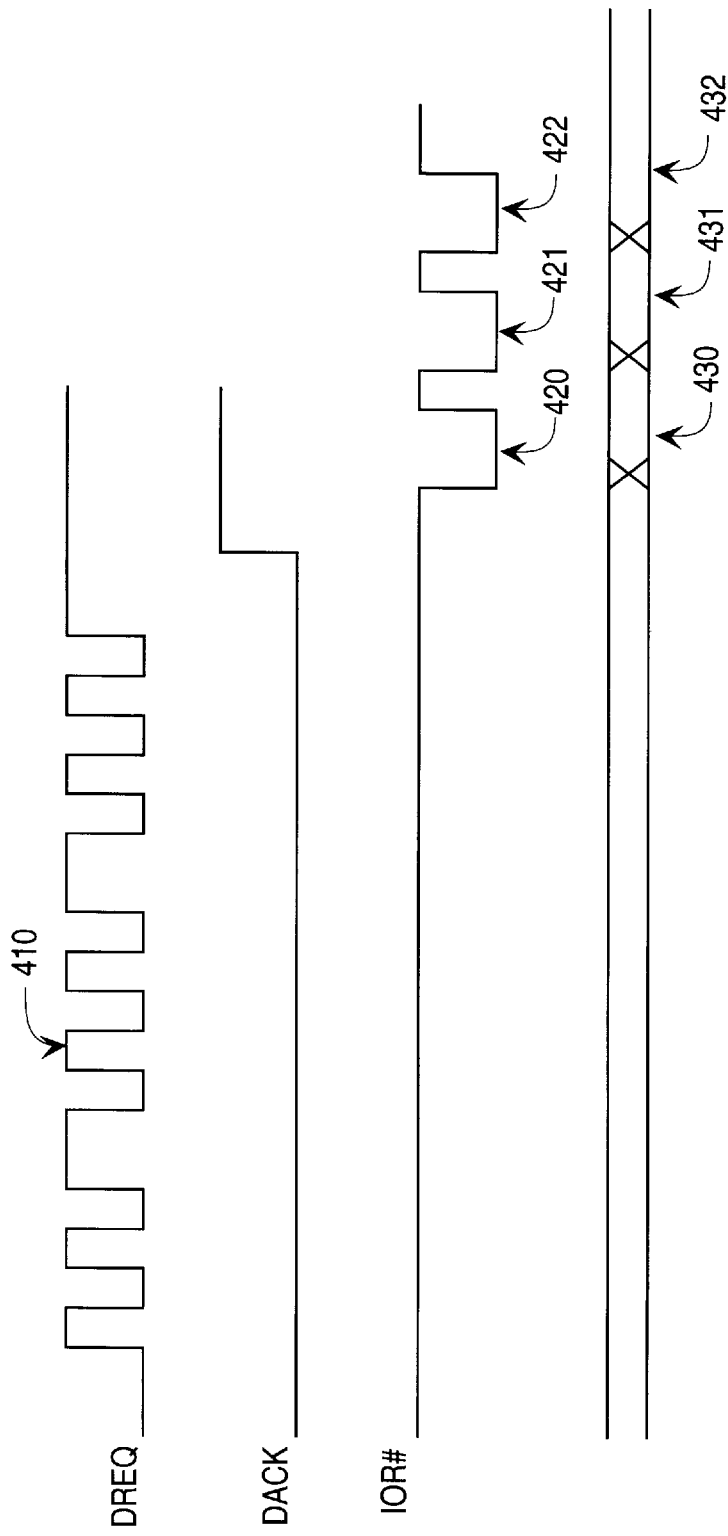
FIG. 4 illustrates the activities on the signal lines and data bus in a second embodiment of the present invention.

The present invention can program relevant start addresses, length values, and transfer directions on the DMA controller through means other than the data bus. FIG. 4 illustrates an example of how a peripheral can transmit start addresses, length values, and directional information through an encoded request signal. After the CPU programs the peripheral of the present invention with start address, length filed, and transfer directions, and after the CPU asserts a start command to the peripheral, the peripheral requests access to the bus by signaling the DMA controller via a DMA request line. This is shown by signal 410. The present invention can be configured so that the peripheral encodes information regarding start addresses, length values, and transfer directions on the DREQ line which the DMA controller can read. By using the DREQ line as the means of programming the DMA controller, the present invention need not utilize I/O read cycles to send information from the peripheral to the DMA controller through the data bus. If the data transfer involves moving data from the peripheral to main memory, the first several read cycles shown by low signal 420, 421, and 422 would be used to send data 430, 431, 432 on the data bus to main memory.

The present invention permits a slave peripheral device to achieve the functional benefits of a bug master without requiring the address and control lines required for a bus master. Typically, a bus master peripheral requires at least 20 lines more than a slave peripheral. These lines include address lines and memory read and write lines which are used by the bus master to communicate directly with main memory. Extra lines on the peripheral require additional component packaging, additional pins on the package, and additional pin holes on the system circuit board. This translates to additional cost to the system which is undesirable. The present invention manages communication between a slave peripheral and main memory through a DMA controller. This allows the present invention to transfer data between the peripheral and memory while requiring the peripheral to have only a minimal number of lines. The lines required are the data request, data acknowledge, I/O read, and I/O write lines which are already present in a typical slave peripheral.

The present invention improves the performance of peripherals. For example, an ISA bus master peripheral is typically limited to 4 transfers per microsecond. The timing on the address and control lines are defined at approximately 250 nsec per read or write. This translates to a transfer rate of 8 mega bytes per second. This constraint exists because other peripherals on the ISA bus are required to comply with the timing of the bus master. The present invention utilizes a unique data acknowledge line that can only be asserted by a DMA controller to one peripheral at a time. When the data acknowledge line becomes active for one peripheral, the other peripherals ignore the current timing asserted by the bus master on the data bus. In a sense, this gives a peripheral a private interface by granting it full control of the bus. Thus, data transfers are no longer bound by the 250 nsec rate. The present invention can transfer data to memory at the rate of the high speed I/O bus on the computer system.

Figure 5:
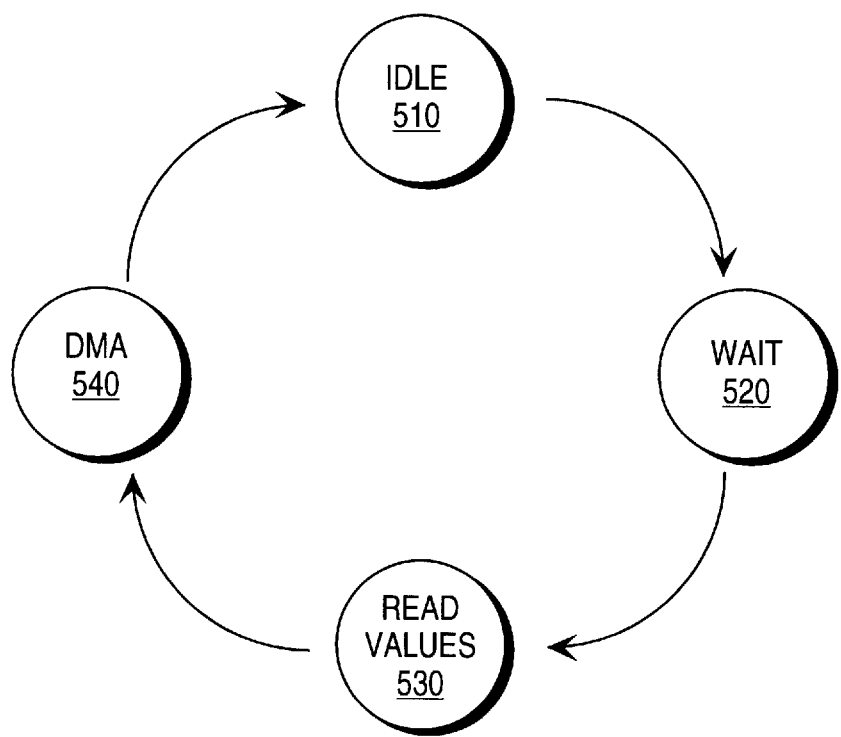
FIG. 5 illustrates a state diagram of a state machine in one embodiment of a peripheral configured with the present invention.

FIG. 5 illustrates a state diagram for one embodiment of the peripheral PBM logic 220 in peripheral 130. Circle 510 illustrates the idle state. The peripheral PBM logic 220 is in the idle state when there is no data transfer. Circle 520 illustrates the wait state. When a DMA request occurs, peripheral PBM logic 220 is in the wait state. While in the wait state, peripheral PBM logic 220 waits for the data bus to become available for data transfer. When the data bus is available, the DMA controller responds with a DMA acknowledge signal. After receiving a DMA acknowledge signal, the PBM logic is in the read values state 530. While in the read values state, peripheral PBM logic 220 instructs peripheral 130 to respond to I/O reads by the DMA controller by sending address counter, length, and transfer directions. After peripheral 130 responds to the I/O reads by the DMA controller, peripheral PBM logic 220 is in the DMA state 540. Peripheral PBM logic 220 instructs peripheral 130 to perform standard DMA while in the DMA state. Peripheral PBM logic 220 remains in the DMA state as long as the DMA request and DMA acknowledge signals are active. When the DMA request signal becomes inactive, the PBM logic returns to the idle state.

Figure 6:
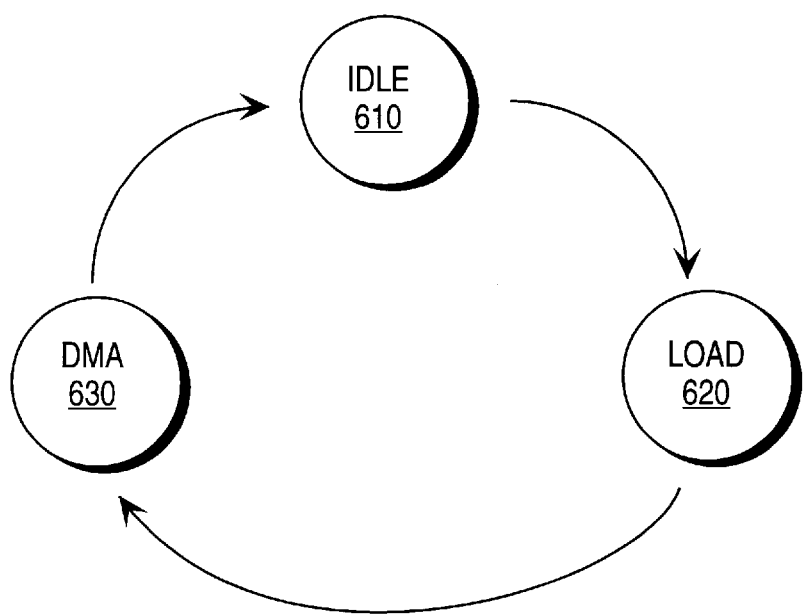
FIG. 6 illustrates a state diagram of a state machine in one embodiment of a DMA controller configured with the present invention.

FIG. 6 illustrates a state diagram for one embodiment of the DMA PBM logic 125 in bus bridge 120. Circle 610 illustrates the idle state. DMA PBM logic 125 is in the idle state when there is no data transfer. Circle 620 illustrates the load state. When a DMA request occurs, logic 130 is in the load state. While in the load state, DMA PBM logic 125 instructs the DMA controller 121 to perform I/O reads to load address counter, length, and direction fields from a peripheral utilizing the present invention. After the DMA controller 121 has read in the address counter, length, and direction fields, DMA PBM logic 125 is in the DMA state 630. While in the DMA state, DMA PBM logic 125 instructs the DMA controller to perform standard DMA. DMA PBM logic 125 remains in the DMA state as long as the DMA request signal is active. When the DMA request signal becomes inactive, the DMA PBM logic 125 returns to the idle state.

Figure 7:
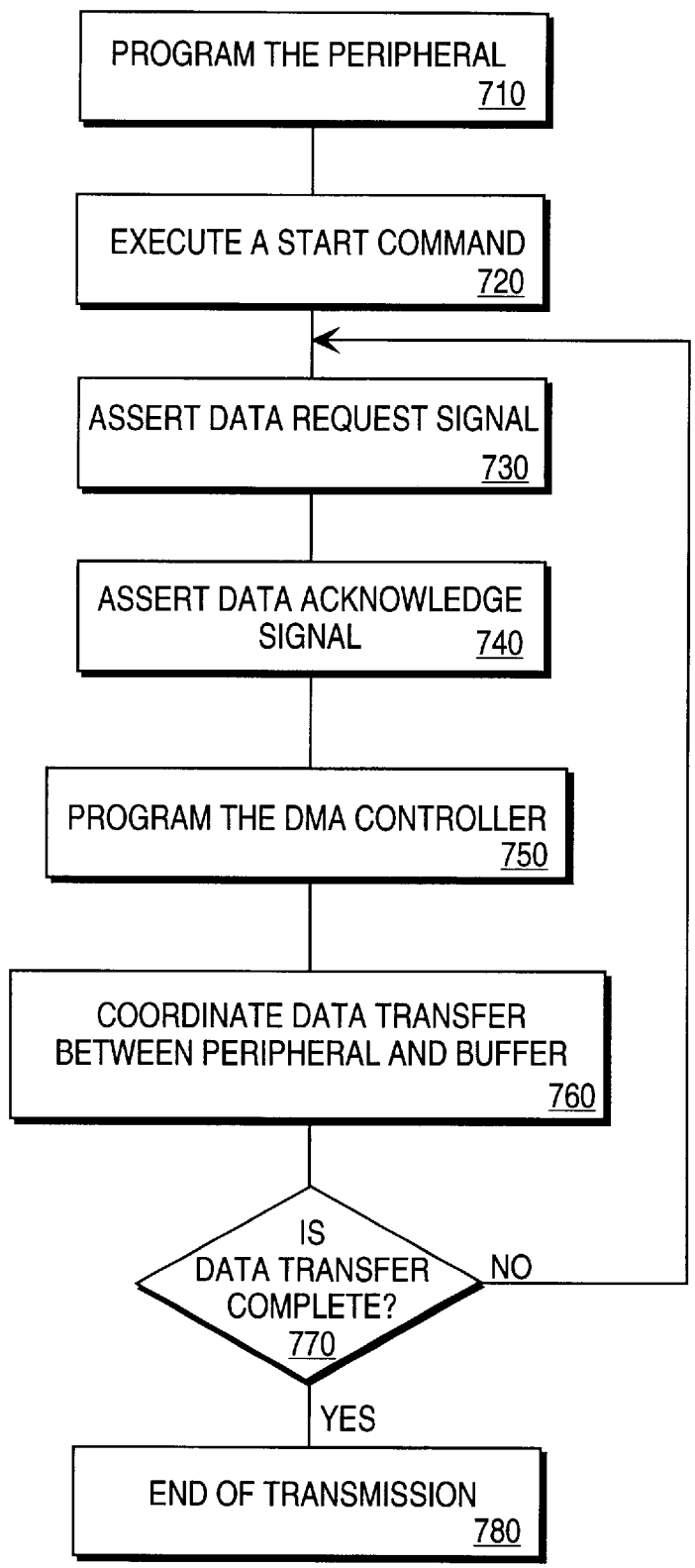
FIG. 7 illustrates a flow chart showing one embodiment of a method according to the present invention.

FIG. 7 illustrates a flow chart showing one embodiment of a method according to the present invention. First, the CPU programs a peripheral with start address, length field, and direction information of buffers in memory which will participate in data transfer. The information may be actual start addresses, length values, and transfer directions or the information may be an address in memory with a list of this information. This is illustrated in block 710. Next, the CPU executes a start command to the peripheral, as shown in block 720. After the peripheral receives the start command, it makes a requests to the DMA controller to access the bus via special bus request lines, as shown in block 730. When the bus is available, the DMA controller responds by sending an acknowledge signal to the peripheral. This is shown in block 740. The DMA controller asserts several I/O read cycles to allow the peripheral to program the DMA controller with the address of the first buffer that is to be read from or written to by sending the data through the data bus. During the I/O read cycles, the peripheral also programs the DMA controller with the length of this buffer and direction of the data transfer. This is illustrated in block 750. After the DMA controller is programmed, it uses the information to coordinate data transfer between the peripheral and specified locations in memory, as shown in block 760. A counter in the DMA controller is used to keep track of the amount of data being transmitted from or received by the buffer in memory. Data transfer continues until data transfer from or to that buffer is completed. Once data transfer from or to the buffer is complete, the DMA controller sends a signal to the peripheral which causes it to stop reading or writing data. If the data transfer between the peripheral and main memory is completed, the peripheral generates an end of transmission signal, as shown in block 780. If the data transfer between the peripheral and main memory is not completed the peripheral would make a request to the DMA controller to access the bus via special bus request lines, returning to block 730.

Figure 8:
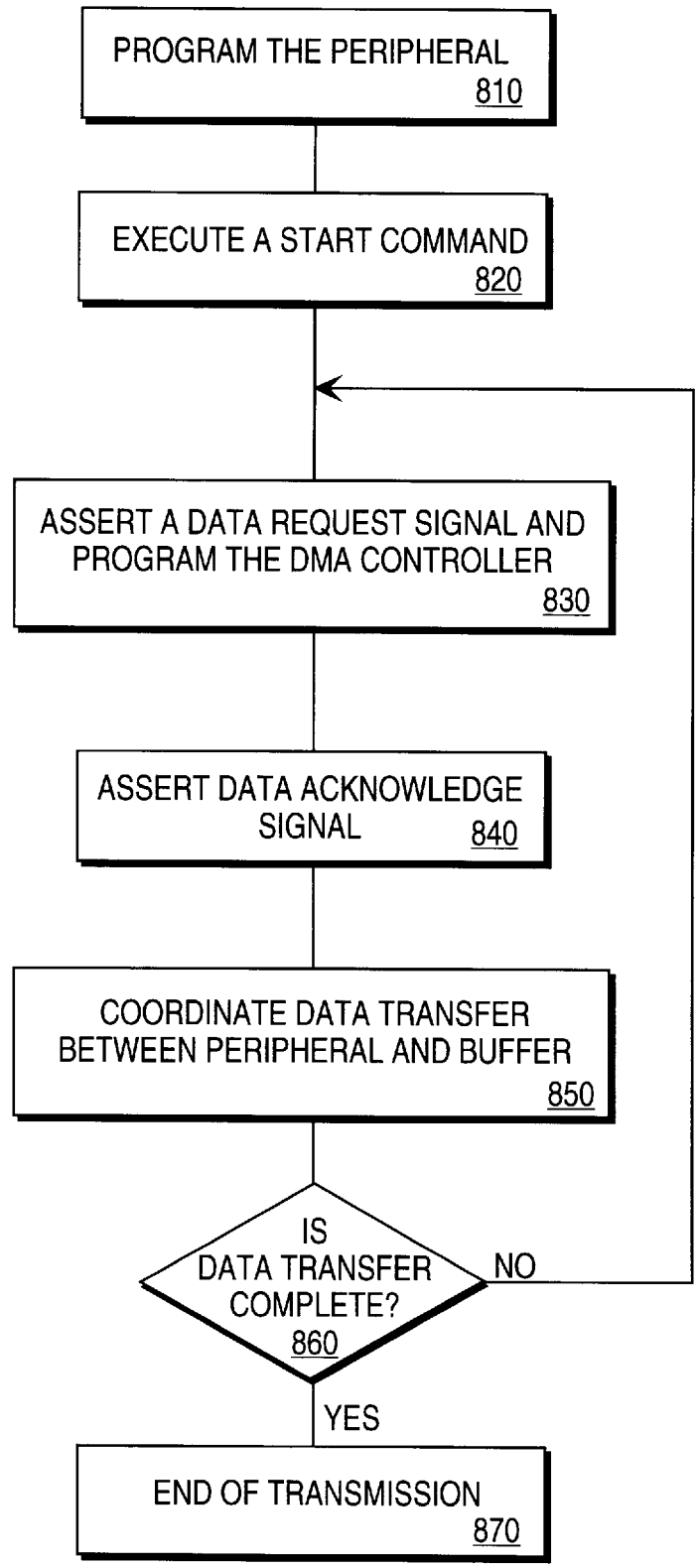
FIG. 8 illustrates a flow chart showing a second embodiment of a method according to the present invention.

FIG. 8 is a flow chart showing a second embodiment of a method according to a second embodiment of the present invention. First, the CPU programs a peripheral with start address, length field, and direction information. The information may be actual start addresses, length fields, and direction or the information may be an address in memory containing a list of this information. This is illustrated in block 810. Next, the CPU executes a start command to the peripheral, as shown in block 820. After the peripheral receives the start command, it makes a requests to the DMA controller to access the bus via special bus request lines, as shown in block 830. The peripheral also programs the DMA controller with the address of the first buffer that is to be read from or written to, the length value of this buffer, and the transfer direction of the data buffer by encoding the request signal with this information. When the bus is available, the DMA controller responds by sending an acknowledge signal to the peripheral. This is shown in block 840. The DMA controller then uses the programmed information to coordinate data transfer between the peripheral and specified locations in memory, as shown in block 850. A counter in the DMA controller is used to keep track of the amount of data being transmitted from or received by the buffer in memory. Data transfer continues until data transfer from or to that buffer is complete. Once data transfer from or to the buffer is complete, the DMA controller sends a signal to the peripheral which causes it to stop reading or writing data. If the data transfer between the peripheral and main memory is completed, the peripheral generates an end of transmission signal, as shown in block 860. If the data transfer between the peripheral and main memory is not completed, the peripheral would make a request to the DMA controller to access the bus and transfer the start address and length of a next buffer via special bus request lines, returning to block 830.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, an apparatus and method for providing the functionalities of a bus master to a peripheral device is disclosed.

What is claimed is:

1. A method for transferring data between a memory and a peripheral in a computer system, comprising:

programming the peripheral with address information and direction information of buffers in the memory;

sending a first memory address and a first transfer direction of a first buffer in the memory from the peripheral to a direct memory access (DMA) controller through a data bus during one or more read cycles when the DMA controller asserts a data acknowledge line; and coordinating data transfer between the first buffer and the peripheral.

2. The method of claim 1, wherein the address information are memory addresses of a plurality of buffers in the memory and the direction information are transfer directions of the plurality of buffers in the memory.

3. The method of claim 1, wherein the address information and the direction information is an address in the memory containing a list of pointers to buffers and their transfer directions.

4. A peripheral device for accessing buffers in memory, comprising:

storage space that stores address information and direction information of the buffers received by a processor; and circuitry, coupled to the storage space, that sends a first memory address and a first transfer direction of a first buffer to a direct memory access (DMA) controller through a data bus during one or more read cycles when the DMA controller asserts a data acknowledge line.

5. The peripheral device of claim 4, wherein the address information are memory addresses of buffers in the memory, the direction information are transfer directions of the plurality of buffers in the memory, and the storage space comprises a plurality of registers that store the first memory addresses and the first transfer direction in the peripheral device.

6. The peripheral device of claim 5, wherein the address information and the direction information is an address in the memory containing a list of pointers to buffers and their transfer directions and the storage space contains a register that stores the address in the memory.

7. A direct memory access (DMA) controller for coordinating data transfer between a memory and a peripheral device, comprising:

a first register that stores a memory address of a buffer in the memory;

a second register coupled to the first register that stores a transfer direction of the buffer in the memory;

a circuit, coupled to the first register and the second register, that retrieves the memory address and the transfer direction from the peripheral device through a data bus during one or more read cycles when the DMA controller asserts a data acknowledge line.

8. A computer system, comprising:

a memory having a plurality of buffers that store data;

a peripheral device, coupled to the memory, having storage space that stores memory address information and transfer direction information of the plurality of buffers and a first circuit that forwards a first memory address and a first transfer direction of a first buffer;

a microprocessor, coupled to the memory, that forwards the memory address information and the transfer direction information of the plurality of buffers to the peripheral device; and a direct memory access (DMA) controller, coupled to the peripheral device, that coordinates DMA data transfers between the peripheral device and the memory, the DMA controller having a second circuit that retrieves the first memory address and the first transfer direction of the first buffer from the peripheral device through a data bus during a read cycle when the DMA controller asserts a data acknowledge line and registers that store the first memory address and the first transfer direction of the first buffer.

9. The method of claim 1, further comprising the step of sending a second memory address and a second transfer direction of a second buffer in the memory from the peripheral to the DMA controller when data transfer between the first buffer and the peripheral is completed and additional data transfer is required.

10. A method for transferring data between a memory and a peripheral in a computer system, comprising:

programming the peripheral with address information and direction information of buffers in the memory;

sending a first memory address and a first transfer direction of a first buffer in the memory from the peripheral to a direct memory access (DMA) controller through a control line on an encoded DMA request signal when the DMA controller asserts a data acknowledge line; and coordinating data transfer between the first buffer and the peripheral.

11. The method of claim 10, further comprising the step of sending a second memory address and a second transfer direction of a second buffer in the memory from the peripheral to the DMA controller when data transfer between the first buffer and the peripheral is completed and additional data transfer is required.

12. The method of claim 10, wherein the address information are memory addresses of a plurality of buffers in the memory and the direction information are transfer directions of the plurality of buffers in the memory.

13. The method of claim 10, wherein the address information and the direction information is an address in the memory containing a list of pointers to buffers and their transfer directions.

14. A peripheral device for accessing buffers in memory, comprising:

storage space that stores address information and direction information of the buffers received by a processor; and circuitry, coupled to the storage space, that sends a first memory address and a first transfer direction of a first buffer to a direct memory access (DMA) controller through a control line on an encoded DMA request signal when the DMA controller asserts a data acknowledge line.

15. The peripheral device of claim 14, wherein the address information are memory addresses of buffers in the memory, the direction information are transfer directions of the plurality of buffers in the memory, and the storage space comprises a plurality of registers that store the first memory addresses and the first transfer direction in the peripheral device.

16. The peripheral device of claim 14, wherein the address information and the direction information is an address in the memory containing a list of pointers to buffers and their transfer directions and the storage space contains a register that stores the address in the memory.

17. A direct memory access (DMA) controller for coordinating data transfer between a memory and a peripheral device, comprising:

a first register that stores a memory address of a buffer in the memory;

a second register coupled to the first register that stores a transfer direction of the buffer in the memory;

a circuit, coupled to the first register and the second register, that retrieves the memory address and the transfer direction from the peripheral device through a control line on an encoded DMA request signal when the DMA controller asserts a data acknowledge line.

18. A computer system, comprising:

a memory having a plurality of buffers that store data;

a peripheral device, coupled to the memory, having storage space that stores memory address information and transfer direction information of the plurality of buffers and a first circuit that forwards a first memory address and a first transfer direction of a first buffer;

a microprocessor, coupled to the memory, that forwards the memory address information and the transfer direction information of the plurality of buffers to the peripheral device; and a direct memory access (DMA) controller, coupled to the peripheral device, that coordinates DMA data transfers between the peripheral device and the memory, the DMA controller having a second circuit that retrieves the first memory address and the first transfer direction of the first buffer from the peripheral device through a control line on an encoded DMA request signal when the DMA controller asserts a data acknowledge line, and registers that store the first memory address and the first transfer direction of the first buffer.

* * * * *

UNITED STATES PATENT AND TRADEMARK OFFICE
CERTIFICATE OF CORRECTION

PATENT NO. : 5,890,012  
DATED : March 30, 1999  
INVENTOR(S) : Poisner

It is certified that error appears in the above-identified patent and that said Letters Patent is hereby corrected as shown below:

Column 6,
Line 52, delete "bug" and insert -- bus --.

Signed and Sealed this

Twenty-fifth Day of November, 2003

JAMES E. ROGAN
*Director of the United States Patent and Trademark Office*